US010896483B2

(12) United States Patent
Rasheed et al.

(10) Patent No.: US 10,896,483 B2
(45) Date of Patent: Jan. 19, 2021

(54) DYNAMIC CONTENT GENERATION SYSTEM

(71) Applicant: ADOBE INC., San Jose, CA (US)

(72) Inventors: Fabin Rasheed, Bangalore (IN); Sreedhar Rangathan, Chennai (IN)

(73) Assignee: ADOBE INC., San Jose, CA (US)

( * ) Notice: Subject to any disclaimer, the term of this patent is extended or adjusted under 35 U.S.C. 154(b) by 137 days.

(21) Appl. No.: 16/220,990

(22) Filed: Dec. 14, 2018

(65) Prior Publication Data

US 2020/0193564 A1  Jun. 18, 2020

(51) Int. Cl.
*G06T 3/40* (2006.01)
*G06T 7/90* (2017.01)
*G06T 5/50* (2006.01)

(52) U.S. Cl.
CPC .............. *G06T 3/4038* (2013.01); *G06T 5/50* (2013.01); *G06T 7/90* (2017.01)

(58) Field of Classification Search
CPC ............ G06T 3/4038; G06T 7/90; G06T 5/50
See application file for complete search history.

(56) References Cited

U.S. PATENT DOCUMENTS

| | | | | |
|---|---|---|---|---|
| 5,936,606 A | * | 8/1999 | Lie | G09G 5/02 345/629 |
| 6,393,160 B1 | * | 5/2002 | Edgar | G06T 5/50 348/E5.049 |
| 2015/0078731 A1 | * | 3/2015 | Nishizaka | G11B 27/034 386/241 |
| 2015/0302566 A1 | * | 10/2015 | Shibata | G06K 9/6255 382/159 |
| 2018/0225799 A1 | * | 8/2018 | Davis | G06T 7/337 |
| 2020/0065605 A1 | * | 2/2020 | Manako | G01C 15/06 |
| 2020/0074708 A1 | * | 3/2020 | Park | G06K 9/2054 |

* cited by examiner

*Primary Examiner* — John B Strege
(74) *Attorney, Agent, or Firm* — Shook, Hardy & Bacon LLP

(57) ABSTRACT

Dynamic image content is generated based on various combinations of image elements associated with an input image unit. In this regard, an input image unit is selected and input into a dynamic content generation engine. The input image unit includes a number of image elements. Different combinations of image elements in the input image are added and/or removed to generate candidate image units. Different colors may be also be assigned to image elements based on a color palette. In this way, permutatively different candidate image units are automatically generated with different combination of elements from the input image unit and possibly different colors. Generation of candidate image units can be based on the application of a combination formula onto the image elements associated with the input image unit. The candidate image units are then displayed for selection and further modification.

19 Claims, 16 Drawing Sheets
(8 of 16 Drawing Sheet(s) Filed in Color)

DYNAMIC CONTENT GENERATION SYSTEM

BACKGROUND

Branding is the characterization and development of an identity, including its character, contents, images, and anticipated relationships with consumers, users, shareholders, suppliers, the media, and/or employees. A brand identifier (e.g., NIKE Swoosh®, ADIDAS Trefoil®, ADOBE A®), is one aspect of a branding strategy. A brand identifier can be a name, term, image, design, symbol, or other feature that uniquely identifies an entity (e.g., company, organization, good, service, product line, etc.). An entity can utilize a brand identifier in a variety of applications, from business cards, letterhead, brochures, and signage to apparel, stationary, gift items, and accessories-collectively known as collateral. Traditionally, entities design and develop a single brand identifier for use on or in conjunction with their collateral. The use of a single brand identifier may provide some level of brand familiarity and minimize consumer confusion. With the rapid change in marketplace landscape and consumer demographics, however, as well as increase in types of collateral on which brand identifiers are used, the need for dynamic, customizable designs that simultaneously resemble the original brand identifier (i.e., variations of a single brand identifier) has also increased.

SUMMARY

Embodiments of the present disclosure relate to computer readable media, methods, and systems that enable an automated pipeline for generating dynamic content (i.e., candidate image units) based on various combinations of image elements associated with an input image unit. In this regard, an input image unit is selected and input into a dynamic content generation engine. The input image unit includes a number of image elements, each image element encoded in image data. The dynamic content generation engine automatically generates candidate image units by adding and/or removing different combinations of image elements from the input image unit. Candidate image units can also be generated by assigning different colors from a color palette to image elements from the input image unit. In this way, permutatively different candidate image units are generated. Generation of candidate image units can be based at least in part on the application of a combination formula onto the image elements associated with the input image unit. The unique candidate image units are then displayed for selection and further modification.

In some embodiments, an image is generated from candidate image units by applying an image overlay, where each candidate image unit from the number of candidate image units serves as a pixel in the image, and each candidate image unit is assigned a color based on the image overlay. In further embodiments, an image is generated from candidate image units by applying a unit grid, where the unit grid comprises a number of unit spaces, and a different candidate image unit is assigned to a unit space of the unit grid. In even further embodiments, an image is generated from candidate image units by applying a color gradient, where each candidate image unit serves as a pixel in the color gradient, and each candidate image unit is assigned a color based on the color gradient.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is described in detail below with reference to the attached drawing figures, wherein.

DETAILED DESCRIPTION

Overview

Figure 1:
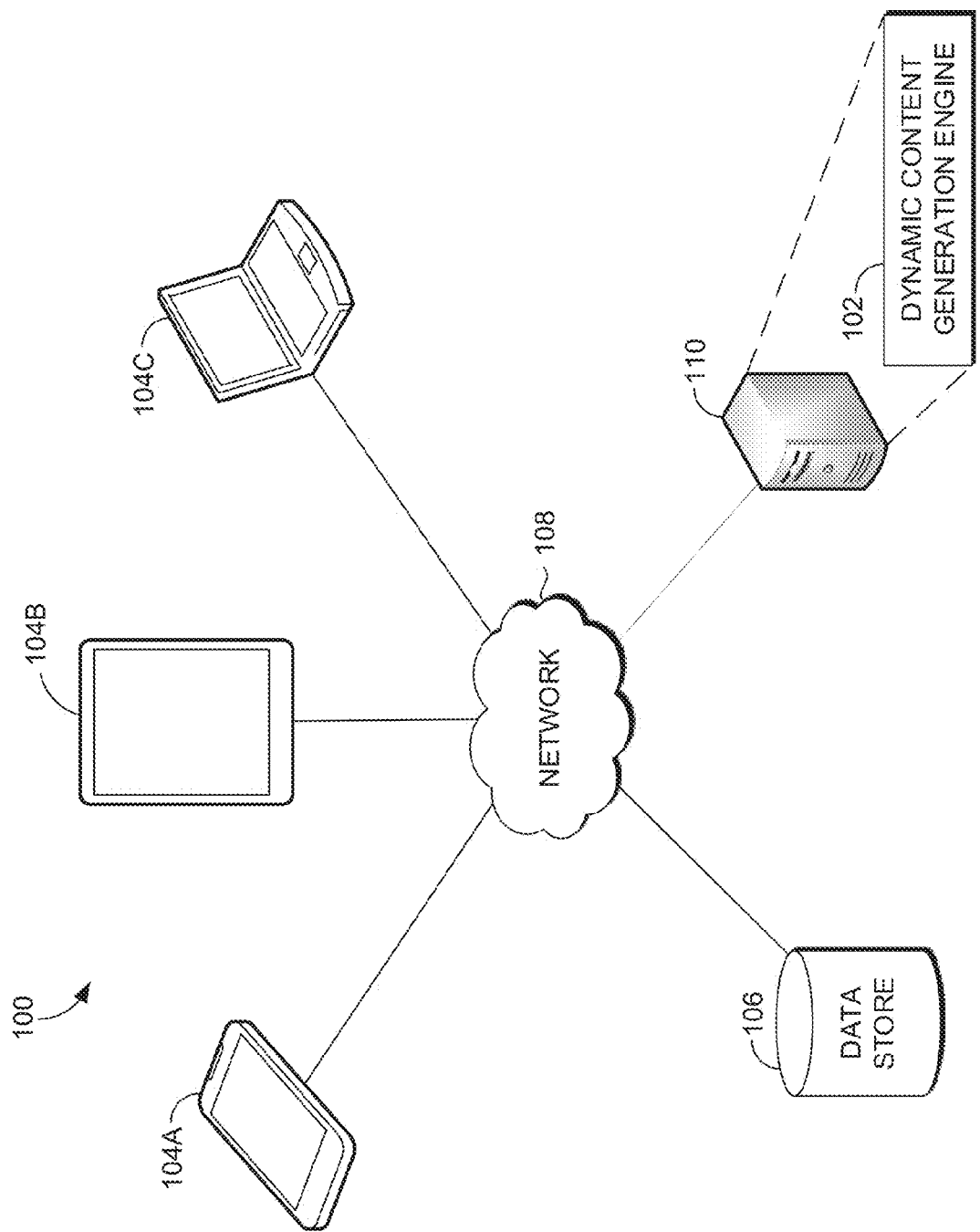
FIG. 1 is a schematic depiction of a dynamic branding system for generating candidate image units based on the manipulation (e.g., adding, removing, and/or re-coloring) of image elements associated with an input image unit, in accordance with embodiments of the present disclosure.

Brand identifiers (e.g., marks, logos, designs, images, etc.) may be designed and developed to identify an entity in the marketplace, distinguish it from other entities, and/or communicate to consumers, users, and/or employees certain messages. By way of non-limiting example, a brand identifier may include a logo that represents an entire company, a design that identifies a particular product line, or a mark that communicates to consumers a particular message an organization wishes to project. Successful branding, that is, successful implementation of brand identifiers, can better position an entity for stronger user engagement, enduring consumer loyalty, and long-term growth.

An entity can utilize a brand identifier in a variety of applications, such as on various forms of collateral. For example, if a law firm sponsors a minority bar association event, it may place its brand identifier on the event materials. If a research institute sends its scientists to present about new discovery at a conference, it may wish to place its brand identifier on the scientists' presentation slides. If a university is attending a high school college fair, they may wish to place its brand identifier on accessories and gift items that can be distributed to prospective applicants.

To accomplish this goal, entities have traditionally engaged in static branding, that is, the creation of a brand identifier (e.g., mark, logo, design, image, etc.) whose image elements (e.g., shapes, etc.) remain the same regardless of where, when, or how the brand identifier is used. For example, given an organization engaged in static branding, the brand identifier it places on gift items used as promotional door prizes at an auction would be identical to the brand identifier it places on its formal business cards for employees and/or its official letterhead.

While static branding may provide some level of brand consistency and familiarity, as well as minimize consumer confusion, with the rapid change in marketplace landscape and consumer demographics, as well as an increase in types of collateral, the need for more than one brand identifier that resembles, and is a variation of, the original brand identifier has also increased. In this regard, dynamic branding, that is, the repositioning of elements associated with an entity's existing brand identifier has become increasingly important. Dynamic branding enables an entity to adapt in parallel to the marketplace and its consumers, and allows an entity to vary its brand identifier to better fit the type of collateral on which it is placed.

Often, once an entity has developed and designed a brand identifier, the task of creating variations of that brand identifier can be costly and time-consuming. For example, a designer may be tasked with generating one hundred unique variations (i.e., candidate image units, iterations) of an existing brand identifier, such that each one of the one hundred unique variations (i.e., iterations) will be placed on one of one hundred promotional door prizes to be distributed to attendees at an event. To generate the one hundred unique variations of an existing brand identifier, the designer must manually manipulate (e.g., reposition, re-color, etc.) each of the image elements associated with the existing brand identifier such that no one of the one hundred unique variations is identical to another. In yet another example, a designer may be tasked with generating a single unique variation of an existing brand identifier to place on banner for an event. To generate the unique single brand identifier that best fits with the banner and the event, the designer must manually manipulate each of the image elements associated with the existing brand identifier, potentially trying various iterations (e.g., combinations of positions, etc.) of the image elements until arriving at a satisfactory unique variation of the existing brand identifier to place on the event banner. In yet an additional example, a designer may be tasked with recreating a famous painting using variations of an existing brand identifier. To recreate the famous painting, not only would the designer generate various combinations of an existing brand identifier, but also manually match each variant with a specific color associated with the famous painting.

Individually manipulating (e.g., repositioning, re-coloring, etc.) each image element associated with an existing brand identifier to generate at least one unique variation of the existing brand identifier can be can be costly and time inefficient. Cost and time inefficiencies increase as the number of image elements associated with the existing brand identifier (i.e., input image unit) increase. Further, as the number and different types of collateral on which unique variations of an existing brand identifier are to be placed increases, the cost and time it takes to generate varied brand identifiers also increases.

Additionally, the lack of an approachable, user-friendly user interface further impairs a designer's ability to efficiently generate varied brand identifies and further modify the varied brand identifiers once generated. In some cases, in the absence of suitable assistance, designers must manually manipulate image elements of an existing brand identifier (i.e., input image unit) to generate its unique variations (i.e., candidate image units). In other cases, content authors must build a brand identifier-specific application, that is, a program written to generate variations of a single unique brand identifier, which can be labor intensive and/or expensive. The cost and tedium of manual varied brand identifier generation may lead a designer or an entity to limit the number of varied brand identifiers to generate. It may also force a designer or entity to opt into implementing a static branding strategy.

In an effort to automate dynamic branding, that is, the automatic generation of brand identifier variations (i.e., candidate image units), one conventional approach is to create a generative system that is brand identifier specific. Such systems have generative code written to create variations of a specific brand identifier. In other words, these systems are specifically written to accommodate a specific brand identifier. While these systems provide some level of brand identifier variation generation, they may not provide scalability, nor are they universal. In other words, because each generative system is tailored to a specific brand identifier, each brand identifier would need its own generative system to generate unique variants, making this solution cost-prohibitive. Further, generative systems lack the ability to necessarily generate all unique combinations of a brand identifier. This limits the types of brand identifier variations a generative system can generate.

Accordingly, embodiments described herein are directed to addressing these technical challenges by providing a solution that automatically generate candidate image units (e.g., alternative brand identifiers) based on combinations of image elements associated with an input image unit (e.g., an input brand identifier). In this regard, embodiments described herein automatically generate candidate image units using combinations of various image elements associated with an input image unit based at least on adding and/or removing various image elements from the input image and/or assigning colors based on a color palette to the various image elements. In operation, candidate image units are generated based on receiving an input image unit that includes a number of image elements. The image elements are identified, and various combinations of image elements are added and/or removed from the input image unit. Colors based on a color palette can additionally or alternatively be assigned to the image elements in the input image unit. Based at least in part on a combination formula, permutatively distinct candidate image units are generated. The number of candidate image units generated may vary based on the addition and/or removal of image elements in the input image unit. Further, the number of candidate image units generated may vary based on the colors assigned to the image elements associated with the input image unit.

In some embodiments, the generated candidate image units are displayed, and in other embodiments, the generated candidate image units are displayed for further modification. In some embodiments, the spacing between each generated candidate image unit, or grouping of candidate image units, is adjustable such that when the candidate image units are displayed, they create any number of patterns. By way of non-limiting example, a user may adjust the spacing of candidate image units such that when generated, they display to a user in a checkerboard pattern.

Modifications of the generated candidate image units can include editing various attributes associated with the candidate image units. In operation, candidate image units can be modified by applying image overlays, unit grids, and color gradients. In some embodiments, an image is generated from the candidate image units by applying an image overlay, where each candidate image unit from the number of candidate image units serves as a pixel in the image, and each candidate image unit is assigned a color based on the image overlay. In further embodiments, an image is generated from the number of candidate image units by applying a unit grid, where the unit grid comprises a number of unit spaces, and a candidate image unit is assigned to each unit space of the unit grid. In even further embodiments, an image is generated from candidate image units by applying a color gradient, where each candidate image unit serves as pixel in the color gradient, and each candidate image unit is assigned a color based on the color gradient.

In some embodiments, the candidate image units are exported as a vector file (e.g., a .svg, .eps, .ai, and .pdf file) containing vector data. In some embodiments, the vector data is editable. In operation, exporting candidate image units as a vector file enables their compatibility with third-party software, such as ADOBE® Illustrator. By way of non-limiting example, a designer may export all generated candidate image units as a portable document format ("PDF") containing vector data. The designer may subsequently open the PDF using ADOBE® Illustrator for various reasons, including but not limited to continued modification of the candidate image units. As can be appreciated, in some embodiments, all of the generated candidate image units are exported as a vector file. In other embodiments, only a portion of the generated candidate image units are exported as a vector file.

In this regard, candidate image units are automatically generated based on variations of the image elements associated with the input image unit, thereby generating all unique, permutatively different variations of the input image unit. Advantageously, technologies described by the current disclosure reduce the cost and time inefficiencies associated with manipulation (e.g., repositioning, re-coloring, etc.) of image elements associated with an input image unit to generate various candidate image units. Further, in providing the candidate image units within a user interface that offers a set of editing tools, including but not limited to the modification of image data (e.g., image overlay, color gradient, unit grid), the disclosed technologies provide a user-friendly interface in which to modify the generated candidate image units and generate additional images based on the candidate image units.

Definitions

Having briefly described an overview of aspects of the present disclosure, various terms used throughout this description are provided. Although more details regarding various terms are provided throughout this description, general descriptions of some terms are included below to provide a clearer understanding of the ideas disclosed herein:

Image Unit—As used herein, the term "image unit" refers to a frame of image data that encodes a visual representation of one or more image elements. Image elements may include background images, foreground images, and the like associated with an image unit, such as but not limited to an input image unit or a candidate image unit. Image elements may also be a shape. Image data included in an image unit may be at least two-dimensional (2D) image data. As such, an image unit is at least a 2D image unit and includes at least one image element. The image element may be associated with and/or positioned at a location within the 2D image unit. Image units may include, but is not otherwise limited to brand identifiers, digital designs, marks, logos, or any other visual image unit. An image unit may be layered and/or include a number of layers. At least one of the number of layers may be an editable layer. The one or more editable layers generally have various modifiable attributes. An image unit may be encoded in any of various digital formats, structures, and/or encoding schemas.

Input Image Unit—As used herein, the term "input image unit" refers to an image unit, comprising at number of image elements, from which candidate image units are generated. In the context of marketing, an input image unit may be a brand identifier, mark, logo, design, or any other image unit that identifies and distinguishes an entity. By way of non-limiting example, an input image unit can include a two pixel by two pixel square, where the square comprises four smaller, one pixel by one pixel squares. Each one by one pixel square contained within the input image unit is an image element. Each image element associated with the input image unit may be assigned a color from a color palette. Image elements associated with an input unit may also be added and/or removed in various combinations. Based at least in part on a combination formula, the image elements associated with an input image unit can be manipulated (e.g., repositioned, re-colored, etc.) to generate unique candidate image units, that is, image units comprising various unique combinations of the image elements associated with the input image unit. By way of non-limiting example, an input image unit may advertise, promote, market, identify, and/or distinguish an entity, such as an organization, company, product, good, and/or service.

Candidate Image Unit—As used herein, the term "candidate image unit" refers to an image unit comprising a unique variation (e.g., combination) of image elements contained within an input image unit. In the context of marketing, a candidate image unit may be a variation of an existing brand identifier, mark, logo, design, or any other image unit that identifies and distinguishes an entity. By way of non-limiting example, an input image unit may be a two pixel by two pixel square, where the input image unit comprises four smaller, one pixel by one pixel squares. Each one by one pixel square contained within the input image unit is an image element. Each image element associated with the input image unit may be assigned a color from a color palette. Each image element associated with an input unit may also be added and/or removed. Based at least in part on a combination formula, the image elements associated with an input image unit can be manipulated (e.g., repositioned, re-colored, etc.) to generate candidate image units, that is, image units comprising various unique combinations of the image elements associated with the input image unit. By way of non-limiting example, an candidate image unit may advertise, promote, market, identify, and/or distinguish an entity, such as an organization, company, product, good, and/or service.

Image Element—As used herein, the term "image element" refers to one or more objects encoded in image data associated with an image unit, such as an input image unit or a candidate image unit. An image element can be manipulated (e.g., repositioned, re-colored, etc.) to generate candidate image unit. By way of non-limiting example, an input image unit may be a two pixel by two pixel square, wherein the square comprises four smaller, one pixel by one pixel squares. Each one by one pixel square contained within the input image unit is an image element. While in this example the four image elements are squares, it should be appreciated that an image element can be any shape, object, and the like.

Combination Formula—As used herein, the term "combination formula" refers to a formula for determining the possible variations of a selected subset of objects (e.g., "r" objects) from a set of objects (e.g., "n" objects). The subset of r objects may be less than or equal to the set of n objects. The combination formula is expressed by:

$$nCr = \frac{n!}{r!(n-r)!}$$

for n≥r≥0, where n is a set of objects, and r is a subset of objects in set n. Objects and subsets of objects may include image elements, such as image elements of an input image unit. The variations of image elements generated by the combination formula may be candidate image units. By way of non-limiting example, given an input image unit with seven image elements of the same color, (i.e., where n=7) if three image elements are removed (i.e., r=3), then according to the combination formula, 35 possible candidate image units exist.

Image Data—As used herein, the term "image data" refers to any digital data that encodes visual information. Image data may include image elements associated with an image unit, such as an input image unit and a candidate image unit. Generally, image data can be modified (e.g., repositioned, colored, etc.).

Image Overlay—As used herein, the term "image overlay" refers to image data that encodes a visual representation of an image. An image overlay may be applied to a number of candidate image units to create an image. In operation, an image overlay can be applied to a number of candidate image units such that each candidate image unit from the number of candidate image units serves as a pixel in the image, and each candidate image unit is assigned a color based on the image overlay. By way of non-limiting example, given a number of candidate image units, an image overlay depicting the Mona Lisa may be applied to generate an image out of the number of candidate image units. Here, each candidate image unit from the number of candidate image units is assigned a color based on the image overlay, and each candidate image unit from the number of candidate image units serves as a pixel in the image.

Unit Grid—As used herein, the term "unit grid" refers to a visual representation of a structure with at least one assignable unit space encoded in image data. In embodiments, a unit grid can be a shape, a word, a phrase, or any other structure. A unit space can be used for storing a candidate image unit. A unit grid may be applied to a number of candidate image units to create a second image. By way of non-limiting example, a unit grid may be the phrase "Thank You" where each letter of the phrase includes a number of unit spaces. If the unit grid were applied to a number of candidate image units, a subset of candidate image units from the number of candidate image units may be assigned to the unit spaces from the number of unit spaces associated with the unit grid "Thank You." In operation, a unit grid can be applied to a number of candidate image units to generate an image, the image conforming to the structure of the unit grid, where candidate image units are assigned to each unit space in the unit grid.

Color Gradient—As used herein, the term "color gradient" refers to image data that encodes a visual representation of a color gradient. A color gradient may be applied to a number of candidate image units to create an image. In operation, a color gradient can be applied to a number of candidate image units such that each candidate image unit from the number of candidate image units serves as pixel in the color gradient, and each candidate image unit is assigned a color based on the color gradient. By way of non-limiting example, given a number of candidate image units, a color gradient depicting a color change from red to black may be applied to generate an image out of the number of candidate image units. Here, each candidate image unit from the number of candidate image units is assigned a color based on the color gradient, and each candidate image unit from the number of candidate image units serves as a pixel in the image.

Exemplary Dynamic Content Generation Environment

Turning now to FIG. 1, a schematic depiction is provided illustrating an exemplary dynamic branding environment 100 in which some embodiments of the present disclosure may be employed. Among other components not shown, dynamic branding environment 100 may include a dynamic content generation engine 102, a user device, such as user devices 104A, 104B, and 104C, a data store 106, and a distributed computing environment 110. Distributed computing environment 110 hosts dynamic content generation engine 102. It should be understood that dynamic branding environment 100 shown in FIG. 1 is an example of one suitable computing system. Any of the components shown in FIG. 1 may be implemented via any type of computing device, such as computing device 1600 described with reference to FIG. 16, for example. The components may communicate with each other via one or more networks 108, which may include, without limitation, one or more local area networks (LANs) and/or wide area networks (WANs).

Such networking environments are commonplace in offices, enterprise-wide computer networks, intranets, and the Internet.

It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Generally, dynamic branding environment 100 facilitates candidate image unit generation based on an input image unit and various combinations of image elements associated with the input image unit. At a high-level, candidate image units are generated by manipulating (e.g., adding, removing, re-coloring, etc.) image elements associated with the input image unit. Generating the various combinations of image elements can be based at least in part on a combination formula. In operation, an input image unit is selected and input into a dynamic content generation engine, such as dynamic content generation engine 102 of FIG. 1. The input image unit includes a number of image elements. In some embodiments, different combinations of image elements from the number of image elements in the input image are added and/or removed. In other embodiments, different colors are assigned to image elements from the number of image elements based on a color palette. Permutatively different candidate image units are generated that conform to the chosen color palette and/or addition and/or removal of various image elements of the input image unit. Generation of candidate image units can be based at least in part on the application of a combination formula onto the image elements associated with the input image unit. The generated candidate image units are displayed for selection and/or further modification.

By way of non-limiting example, assume a designer wishes to create at least one unique variation of an organization's brand identifier. In such as case, the designer selects the input image unit from which they wish to generate variations. The input image unit comprises a number of image elements, each image elements making up a portion of the input image unit. The number of image elements are encoded in image data. The number of image elements can be manipulated (e.g., adding, removing, re-colored, etc.) to generate candidate image units, which are variations of the input image unit. Upon selecting the input image unit, color can be assigned to at least one of the image elements. Additionally and/or alternatively, various combinations of image elements can be added and/or removed. Candidate image units are generated that conform to the assigned colors and/or the addition or removal of various combinations of image elements. Generation of candidate image units can be based at least in part on the application of a combination formula onto the image elements associated with the input image unit.

The combination formula used to generate candidate image units from an input image unit is expressed by:

$$nCr = \frac{n!}{r!(n-r)!}$$

for n≥r≥0, where n is a set of image elements contained within an input image unit, and r is a subset of image elements contained in set n. The combination formula is the formula for determining the possible combinations for a subset of selected image elements (e.g., r) from a larger set of image elements (e.g., n). By way of non-limiting example, given an input image unit with four image elements of the same color, (i.e., where n=4) if one image element is removed (i.e., r=1), then according to the combination formula, four possible candidate image units exist, and all four candidate image units are generated. In yet another example, given an input image unit with 12 image elements of the same color (i.e., n=12), if three image elements are removed (i.e., r=3), then according to the combination formula, 220 possible candidate image units exist, and all 220 candidate image units are generated.

In this regard, the generated candidate image units conform to all possible combinations of image elements based on the number of added and/or removed image elements from the input image unit. Additionally and/or alternatively, the number of candidate image units generated conform to all possible combinations of images based on colors assigned to each image element based on a color palette. The number of possible combinations that exist and that are generated fluctuates based on the various combinations of image elements added and/or removed, and/or based on the colors assigned to the image elements based on a color palette.

In some embodiments, generated candidate image units are displayed, and in other embodiments, the generated candidate image units are displayed for further modification. Modifications of the generated candidate image units can include editing various attributes associated with the candidate image units. In operation, and by way of non-limiting example, candidate image units are modified by applying image overlays, unit grids, and color gradients. In some embodiments, an image is generated from candidate image units by applying an image overlay, where different candidate image units from serve as pixels in the image, and each candidate image unit is assigned a color based on the image overlay. In further embodiments, an image is generated from candidate image units by applying a unit grid, where the unit grid comprises a number of unit spaces, and each candidate image unit is assigned to a unit space of the unit grid. In even further embodiments, an image is generated from candidate image units by applying a color gradient, where each candidate image unit serves as a pixel in the color gradient, and each candidate image unit is assigned a color based on the color gradient.

Returning to FIG. 1, in operation, a user device, such as user devices 104A through 104C, can access dynamic content generation engine 102, hosted by the distributed computing environment 110 (e.g., a server), over a network 108 (e.g., a LAN or the Internet). For instance, a user device, such as user devices 104A through 104C may provide and/or receive data from the dynamic content generation engine 102 via the network 108. Network 108 may include multiple networks, or a network of networks, but is shown in simple form so as not to obscure aspects of the present disclosure. By way of example non-limiting, network 108 can include one or more wide area networks (WANs), one or more local area networks (LANs), one or more public networks, such as the Internet, and/or one or more private networks. Networking environments are commonplace in offices, enterprise-wide computer networks, intranets, and the Internet. Accordingly, network 108 is not described in significant detail.

A user device, such as user devices 104A through 104C, may be any computing device that is capable of facilitating a user (e.g., designer, marketer, advertiser, etc.) to select an input image unit. An input image unit, as described herein, generally refers to an image unit, comprising a number of image elements, from which candidate image units are generated. In the context of marketing, an input image unit may be a brand identifier, mark, logo, design, or any other image unit that identifies and distinguishes an entity. By way of non-limiting example, an input image unit can include a two pixel by two pixel square, wherein the square comprises four smaller, one pixel by one pixel squares. Combinations of various image elements associated with the input image unit can be added and/or removed from an input image unit, as well as assigned a color based on a color palette, to generate candidate image units. For example, a user may provide an input image unit to the dynamic content generation engine 102 via a browser or application installed on a user device, such as user devices 104A through 104C. Further, any type of user interface may be used to input such input image unit. In some cases, a user may input an input image unit, for example, by copying/pasting an input image unit or selecting the input image unit from a data store, such as data store 106.

In some embodiments, in response to providing image input unit, a user device, such as user devices 104A through 104C, generates and presents at least one candidate image unit, or a portion thereof. In this regard, candidate image units generated in response to the user-provided input image unit are provided to the user device for display to the user (e.g., via a browser or application installed on a user device, such as user devices 104A through 104C).

In some cases, a user device, such as user devices 104A through 104C, accesses the dynamic content generation engine 102 via a web browser, terminal, or standalone PC application operable on the user device. A user device, such as user devices 104A through 104C, might be operated by an administrator, which may be an individual or set of individuals that manages generation of candidate image units associated with an advertising campaign, a branding strategy, an event, or the like. For instance, a user may be any individual, such as a designer, advertiser, marketer, or promoter, associated with an entity (e.g., an organization) that desires to generate candidate image units for placement on various collateral (e.g., business cards, brochures, signage, gift items, etc.). While only user devices 104A through 104C are illustrated in FIG. 1, multiple other user devices associated with any number of users may be utilized to carry out embodiments described herein. A user device, such as user devices 104A through 104C, may take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, a user device, such as user devices 104A through 104C, may include one or more processors, and one or more computer-readable media. The computer-readable media may include computer-readable instructions executable by the one or more processors.

In some cases, a user of distributed computing environment 110 may employ one or more user interfaces via a web browser, terminal, or standalone PC application operable on the distributed computing environment to control and/or operate dynamic content generation engine 102 to generate candidate image units. Users of distributed computing environment 110 may further control and/or operate dynamic content generation engine 102 to select and/or further modify generated candidate image units that may be displayed on a user device, such as user devices 104A through 104C. Distributed computing environment 110 may be operated by an administrator, which may be an individual or set of individuals that manages image units associated with an advertising campaign, a branding strategy, or the like. For instance, a user may be any individual, such as a designer, advertiser, marketer, or promoter, associated with an entity (e.g., organization) that desires to generate candidate image units for placement on various collateral (e.g., business cards, brochures, signage, gift items, etc.). While only distributed computing environment 110 is illustrated in FIG. 1, multiple other distributed computing devices associated with any number of users may be utilized to carry out embodiments described herein.

A distributed computing environment, such as distributed computing environment 110, may take on a variety of forms such as a server, personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device. Further, a distributed computing environment, such as distributed computing environment 110, may include one or more processors, and one or more computer-readable media. The computer-readable media may include computer-readable instructions executable by the one or more processors.

The data store 106 includes, among other data, input image unit data that may contain desired information used to facilitate candidate image unit generation. As described in more detail below, the data store 106 may include input image unit data including logos, designs, marks, or the like, and/or metadata associated therewith. Data store 106 may also include input image unit data containing image element data. Data store 106 may also include image overlay data, unit grid data, and/or color gradient data, used to modify candidate image units and generate a number of images. Additionally and/or alternatively, data store 106 may also include additional information, such as image data, and the like, used to generate and/or modify candidate image units. Such image data may be stored in the data store 106 and accessible to any component of the dynamic branding environment 100. The data store may also be updated at any time, including an increase or decrease in the amount of input image unit data. Further, the input image unit data, or any other data, contained within data store 106 may be changed, altered, updated, or the like, at any time.

The dynamic content generation engine 102 is generally configured to generate candidate image units from preexisting input image units and, thereafter, may cause display of the candidate image units for further selection and/or modification. In particular, the dynamic content generation engine 102 can collect input image units, identify image elements associated with the input image units, receive an addition and/or removal selection of different combinations of image elements, receive a color assignment for each image element based on a color palette, vary the image elements from the number of image elements based at least in part on a combination formula, generate candidate image units, cause display of the candidate image units for modification and selection, and receive an image overlay, unit grid, and/or a color gradient to modify the candidate image units and/or generate an image.

In implementation, and at a high-level, the dynamic content generation engine 102 collects input image units to use as a basis to generate candidate image units. In particular, the dynamic content generation engine 102 generates candidate image units that are each a unique variant of the input image unit by varying the image elements from the number of image elements associated with the image input unit to generate candidate image units using at least in part a combination formula. In some embodiments, to generate the candidate image units, the dynamic content generation engine 102 receives an addition and/or removal selection that adds and/or removes various combinations of the image elements associated with the input image unit. Further, and in other embodiments, dynamic content generation engine 102 receives a color assignment for at least one image element associated with the input image unit, where the color assignment is based on a color palette. Based at least in part on a combination formula, candidate image units are then generated and may be presented for further modification and/or selection.

In some embodiments, one modification includes the dynamic content generation engine 102 receiving a selection of an image overlay to be applied to the candidate image units. In this regard, the dynamic content generation engine 102 generates an image based on an image overlay applied to the candidate image units, where each candidate image unit serves as a pixel in the first image and each candidate image unit is assigned a color based on the image overlay. In other embodiments, another modification includes the dynamic content generation engine 102 receiving a selection of a unit grid to be applied to the candidate image units. In this regard, the dynamic content generation engine 102 generates an image based on a unit grid applied to the candidate image units, where each unit grid contains a number of unit spaces, and where each candidate image unit is assigned a to a unit space of the unit grid. In even further embodiments, another modification includes the dynamic content generation engine 102 receiving a selection of a color gradient to be applied to the candidate image units. In this regard, the dynamic content generation engine 102 generates an image where each candidate image unit serves as a pixel in the third image, and each candidate image unit is assigned a color based on the color gradient Although FIG. 1 illustrates a distributed system in which dynamic content generation engine 102 is located on a server remote from user devices 104A through 104C (e.g., distributed computing environment 110), in other embodiments, dynamic content generation engine 102 can be located on, executed by, or otherwise installed on a user device, such as user devices 104A through 104C. Additionally and/or alternatively, in other embodiments, at least one component of dynamic content generation engine 102 can be located on a user device, such as user devices 104A through 104C.

Figure 2:
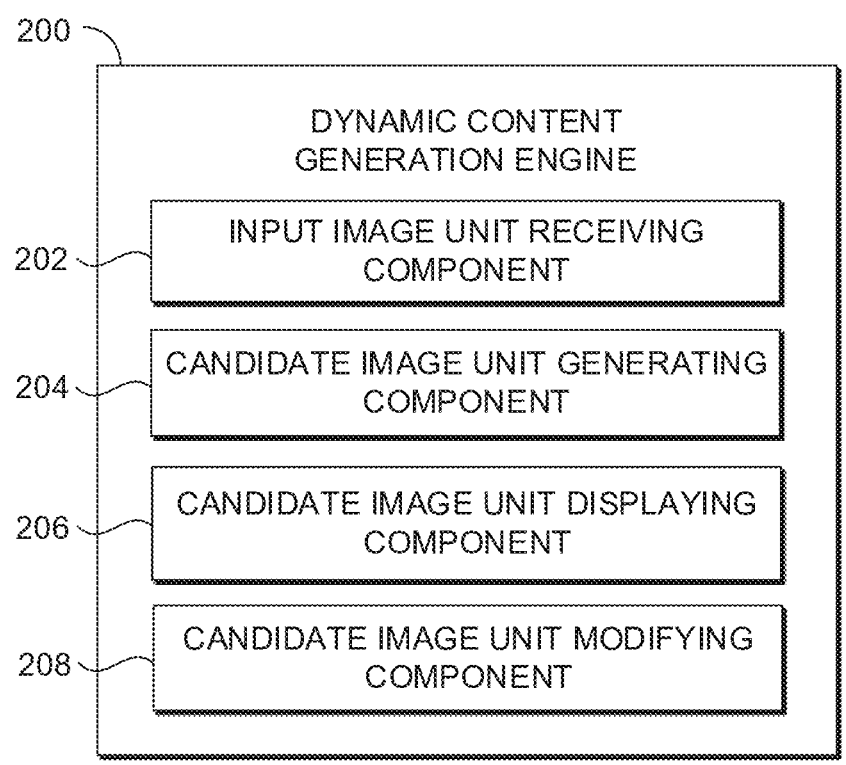
FIG. 2 is a depiction of a dynamic content generation engine, in accordance with embodiments of the present disclosure.

An exemplary dynamic content generation engine is provided in FIG. 2. As shown in FIG. 2, the dynamic content generation engine 200 includes input image unit receiving component 202, candidate image unit generating component 204, candidate image unit displaying component 206, and candidate image unit modifying component 208. The input image unit receiving component 202 is generally configured to receive an input image unit used as a basis to generate candidate image units. The candidate image unit generating component 204 is generally configured to generate candidate image units. The candidate image unit displaying component 206 is generally configured to display the generated candidate image units for further modification and/or selection. The candidate image unit modifying component 208 is generally configured to receive, among other inputs, an image overlay, a unit gradient, and/or a color gradient to further modify the candidate image units and/or generate an image. Advantageously, the content generation engine 200 can automatically generate candidate image units from input image units, which reduces cost and time inefficiencies associated with manual generation of candidate image units based on input image units. Further, in providing the generated candidate image units within a user interface that offers a set of editing tools, including but not limited to modification image data, the dynamic content generation engine 200 supplies a designer and the like with a less intimidating, more efficient user interface in which to modify candidate image units.

Although illustrated as separate components of the dynamic content generation engine 200, any number of components can be used to perform the functionality described herein. Further, although illustrated as being a part of a dynamic content generation engine, the components can be distributed via any number of devices. By way of non-limiting example, an input image unit receiving component can be provided via one device (e.g., a user device, such as user devices 104A through 104C of FIG. 1), server, or cluster of servers, while a candidate image unit generating component can be provided via another device, server, or cluster of servers. The components identified herein are merely set out as examples to simplify or clarify the discussion of functionality. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more components may be carried out by hardware, firmware, and/or software. For instance, various functions may be carried out by a processor executing instructions stored in memory.

As described, the input image unit receiving component 202 is generally configured to receive an input image unit, for example, input by a user (e.g., designer), and used as a basis to generate candidate image units. As described, an input image unit can be a brand identifier, mark, logo, design, or any other image unit that identifies and distinguishes an entity. An input image unit includes a number of image elements. By way of non-limiting example, an input image unit can include a two pixel by two pixel square, wherein the square comprises four smaller, one pixel by one pixel squares. Each one by one pixel square contained within the input image unit is an image element.

In embodiments, an input image unit is received, collected, or obtained by input image unit receiving component 202 in any manner. In some cases, an input image unit is provided by a user of the dynamic content generation engine, such as a designer, advertiser, promoter, and/or marketer. In this regard, a designer or set of designers might select or input an input image unit, for example, via a graphical user interface accessible by way of an application on a user device. As an example, a designer might select an input image unit via a user device, such as user devices 104A through 104C of FIG. 1, which is connected to the network 108. For instance, a designer might select, for example, a logo associated with a unique line of products an organization wishes to generate variations of for a special promotion, as the input image unit from which a dynamic content generation engine, such as dynamic content generation engine 102 of FIG. 1, generates candidate image units.

The candidate image unit generating component 204 is generally configured to generate candidate image units based on selected input image units. As described herein, a candidate image unit is an image unit comprising a unique variation (e.g., combination) of image elements contained within an input image unit generated based at least in part of a combination formula. In the context of marketing, a candidate image unit may be a variation of an existing brand identifier, mark, logo, design, or any other image unit that identifies and distinguishes an entity. In embodiments, the candidate image unit generating component 204 receives an input image unit. In other embodiments, the candidate image unit generating component 204 also receives an addition and/or removal of various combinations of image elements associated with the input image unit. In even further embodiments, the candidate image unit generating component 204 receives a color assignment, where each image element is assigned a color based on a color palette. Based at least in part of the addition and/or removal of image elements, the color assignments, and a combination formula, candidate image unit generating component 204 generates the candidate image units, where each candidate image unit is a unique variation of the input image unit.

As can be appreciated, candidate image unit generating component 204 can generate more than one candidate image unit. The quantity of candidate image units candidate image unit generating component 204 generates depends at least in part on the addition and/or removal of various combinations of image elements from the input image unit, as well as the colors assigned to the image elements based on a color palette. In operation, and by way of non-limiting example, if a user (e.g., designer) were to input an input image unit with four image elements of the same color, and if the user were to remove one image element from the input image unit, candidate image unit generating component 204 would generate (e.g., output) four candidate image units. In yet another non-limiting example, if a user (e.g., designer) were to input an input image unit with 12 image elements of the same color, and if the user were to remove three image element from the input image unit, candidate image unit generating component 204 would generate (e.g., output) 220 candidate image units The candidate image unit displaying component 206 is generally configured to display the generated candidate image units for further modification and/or selection. In particular, the candidate image unit displaying component 206 is configured to display the candidate image units along with various modification tools that may be utilized to apply image overlays, unit grids, color gradients, and the like. By way on non-limiting example, display devices that are suitable for displaying a user interface include a computer monitor, a projector, a television, a monitor on a laptop computer, a display on a PDA, and a display on a mobile phone, i.e., a user device. It should be noted that any application or operating system utilizing application windows or the equivalent thereof provides a suitable operating environment for practicing the present disclosure.

Figure 3:
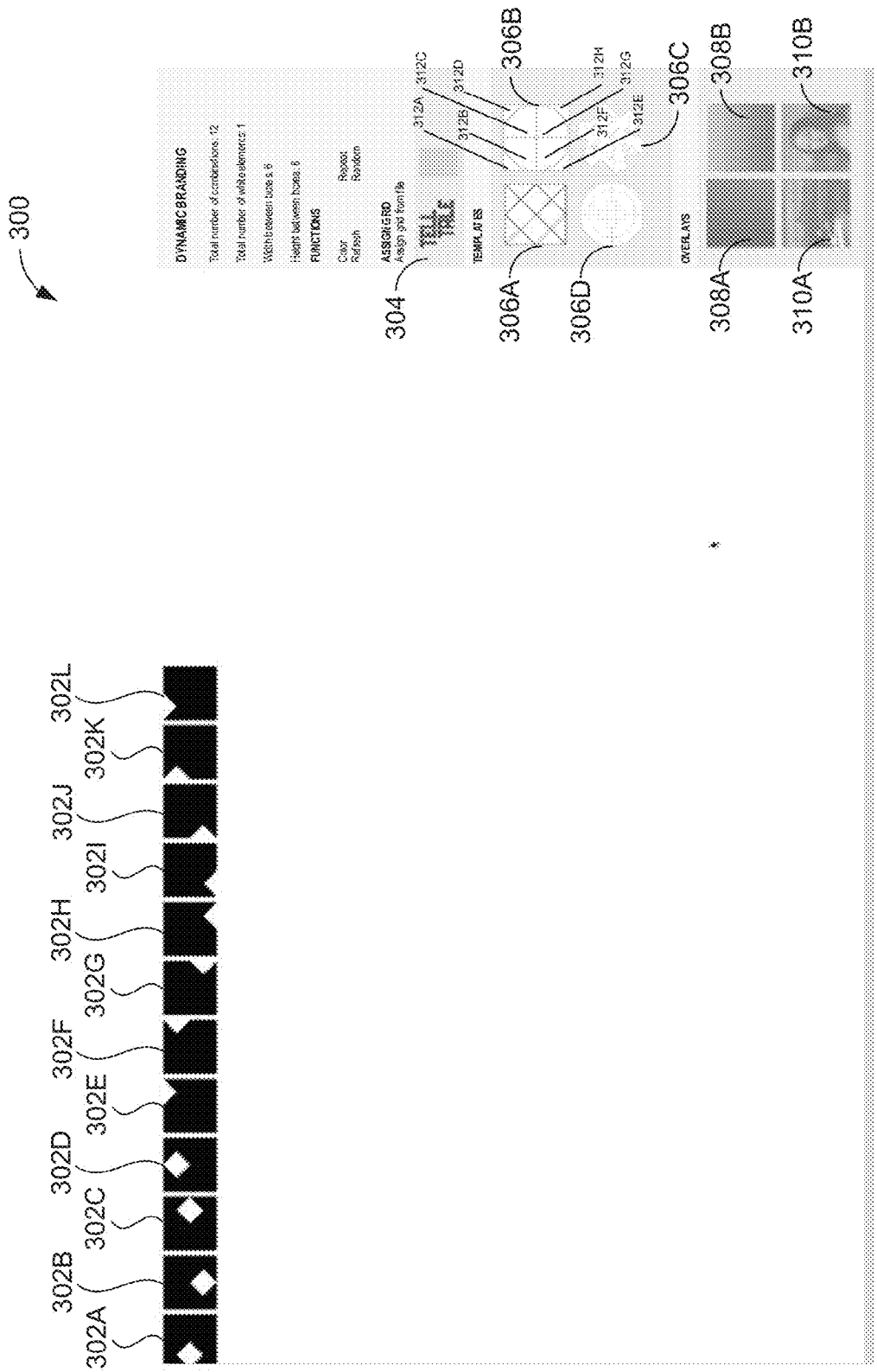
FIG. 3 is a schematic diagram showing an exemplary user interface illustrating generated candidate image units, in accordance with embodiments of the present disclosure.

The candidate image unit modifying component 208 is generally configured to receive, among other inputs, an image overlay, a unit gradient, and/or a color gradient to further modify the candidate image units and/or generate an image. In operation, one modification includes the candidate image unit modifying component 208 receiving a selection of an image overlay to be applied to the candidate image units. In this regard, the candidate image unit modifying component 208 generates an image based on an image overlay applied to the candidate image units, where each candidate image unit serves as a pixel in the first image and each candidate image unit is assigned a color based on the image overlay. In further operation, another modification includes the candidate image unit modifying component 208 receiving a selection of a unit grid to be applied to the candidate image units. In this regard, candidate image unit modifying component 208 generates an image based on a unit grid applied to the candidate image units, where each unit grid contains a number of unit spaces, and where each candidate image unit is assigned a to a unit space of the unit grid. In even further operation, another modification includes the candidate image unit modifying component 208 receiving a selection of a color gradient to be applied to the candidate image units. In this regard, the candidate image unit modifying component 208 generates an image where each candidate image unit serves as a pixel in the image, and each candidate image unit is assigned a color based on the color gradient Turning now to FIG. 3, an exemplary user interface is provided illustrating generated candidate image units, designated generally as user interface 300. The user interface 300 is displayed via a user device, such as user devices 104A through 104C of FIG. 1. The user interface 300 includes candidate image units 302A through 302L, unit grid 304, input image units 306A through 306D, color gradients 308 and 308B, image overlays 310A and 310 B, and image elements 312A through 312H. The candidate image units, such as candidate image units 302A through 302L, are each a unique variation (e.g., contain a unique combination of image elements) of the same input image unit. As illustrated in FIG. 3, if a user (e.g., designer) were to input an input image unit with twelve image elements of the same color (e.g., black), such as input image unit 306A, and one image element is removed from the input image unit, a candidate image unit generating component, such as candidate image unit generating component 204 of FIG. 2, would generate (e.g., output) twelve unique candidate image units, such as candidate image units 302A through 302L, based at least in part on a combination formula.

In embodiments, various input image units, such as input image units 306A through 306D, each having a number of image elements, are input into a dynamic content generation engine, such as dynamic content generation engine 200 of FIG. 2. In some embodiments, a unit grid, such as unit grid 304 is applied to candidate image units 302A through 302L. In other embodiments, a color gradient, such as color gradients 308A and 308B is applied to candidate image units 302A through 302L. In even further embodiments, an image overlay, such as image overlays 310A and 310B is applied to candidate image units 302A through 302L.

Figure 4:
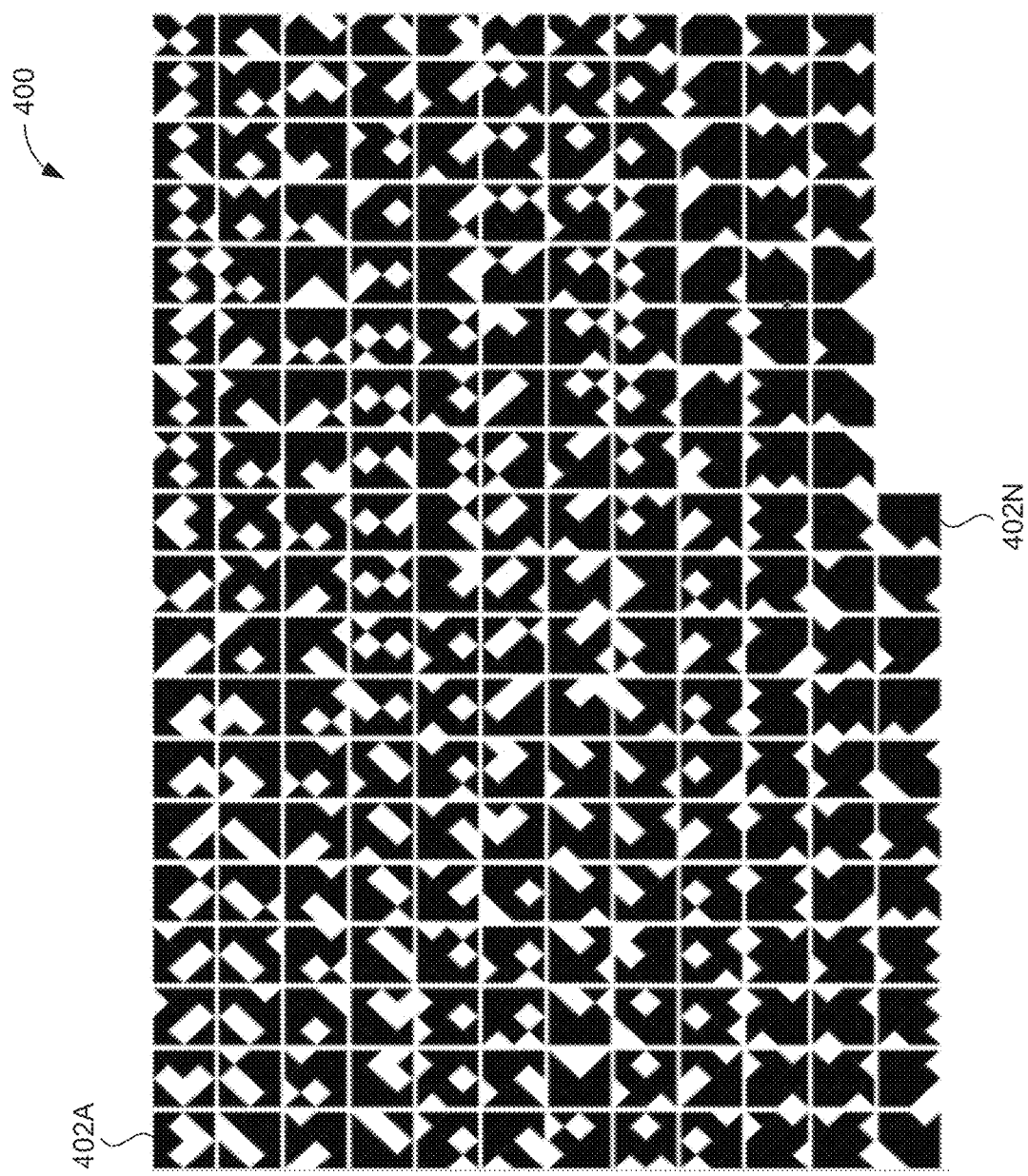
FIG. 4 is a schematic diagram showing another exemplary user interface illustrating generated candidate image units, in accordance with embodiments of the present disclosure.

Turning now to FIG. 4, an exemplary user interface is provided illustrating generated candidate image units, designated generally as user interface 400. The user interface 400 is displayed via a user device, such as user devices 104A through 104C of FIG. 1. The user interface 400 includes candidate image units 402A through 402N. The candidate image elements, such as candidate image units 402A through 402N are each a unique variation (e.g., contain a unique combination of image elements) of the same input image unit. As illustrated in FIG. 4, if a user (e.g., designer) were to input an input image unit with twelve image elements of the same color (e.g., black), such as input image unit 306A of FIG. 3, and three image elements are removed from the input image unit, a candidate image unit generating component, such as candidate image unit generating component 204 of FIG. 2, would generate (e.g., output) 220 unique candidate image units, such as candidate image units 402A through 402N, based at least in part on a combination formula.

Figure 5:
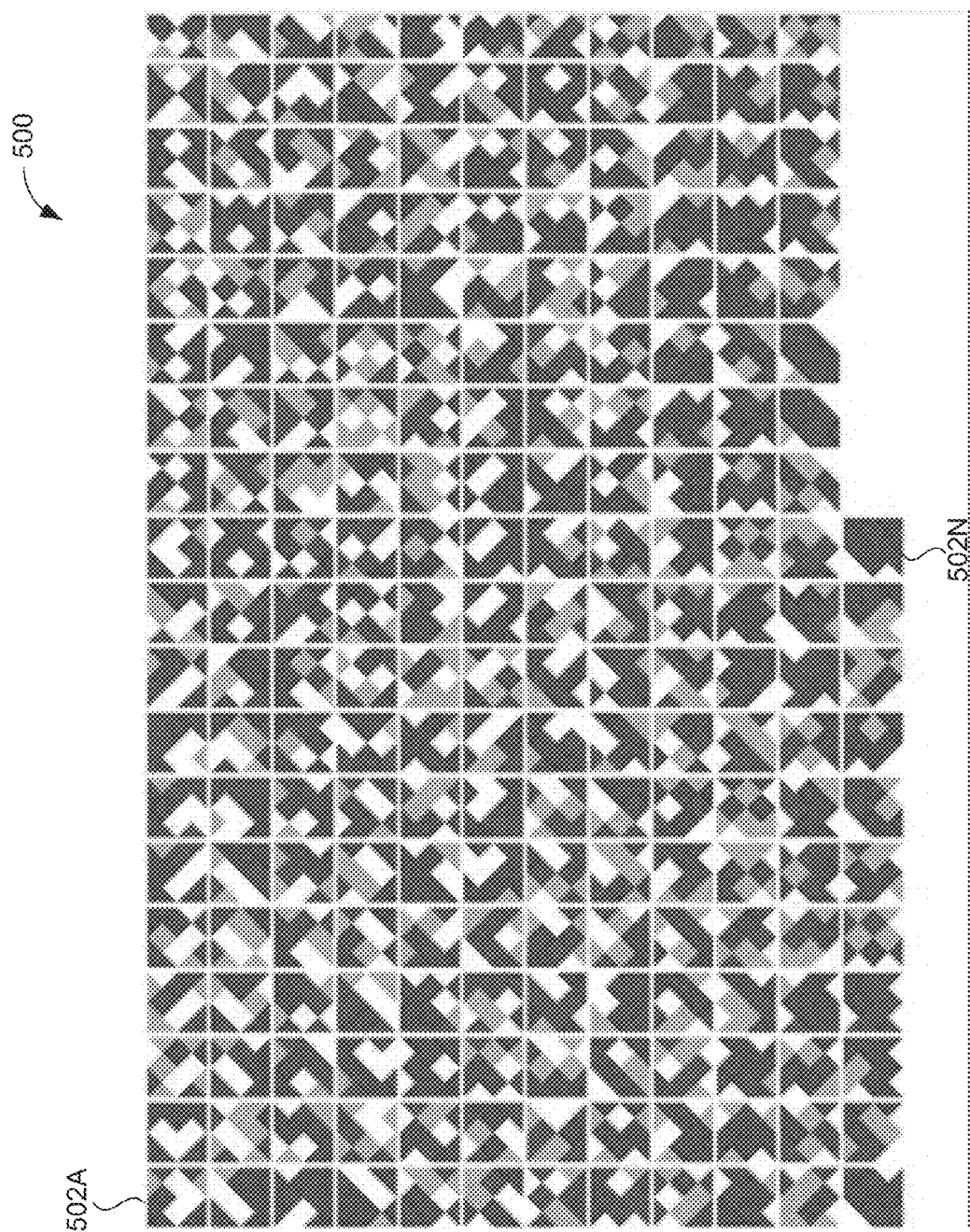
FIG. 5 is a schematic diagram showing an exemplary user interface illustrating generated candidate image units and the application of a color assigned to each image element, the color based on a color palette, in accordance with embodiments of the present disclosure.

Turning now to FIG. 5, an exemplary user interface is provided illustrating generated candidate image units and the application of a color assigned to each image element of the number of image elements, the color based on a color palette, designated generally as user interface 500. The user interface 500 is displayed via a user device, such as user devices 104A through 104C of FIG. 1. The user interface 500 includes candidate image units 502A through 502N. The candidate image elements, such as candidate image units 502A through 502N are each a unique variation (e.g., contain a unique combination of image elements) of the same input image unit. As illustrated in FIG. 5, if a user (e.g., designer) were to input an input image unit with twelve image elements, such as input image unit 306A of FIG. 3, three image elements are removed from the input image unit, and a color is assigned based on a color palette to each of the image elements, a candidate image unit generating component, such as candidate image unit generating component 204 of FIG. 2, would generate (e.g., output) all unique candidate image units, such as candidate image units 502A through 502N, based at least in part on a combination formula.

Figure 6:
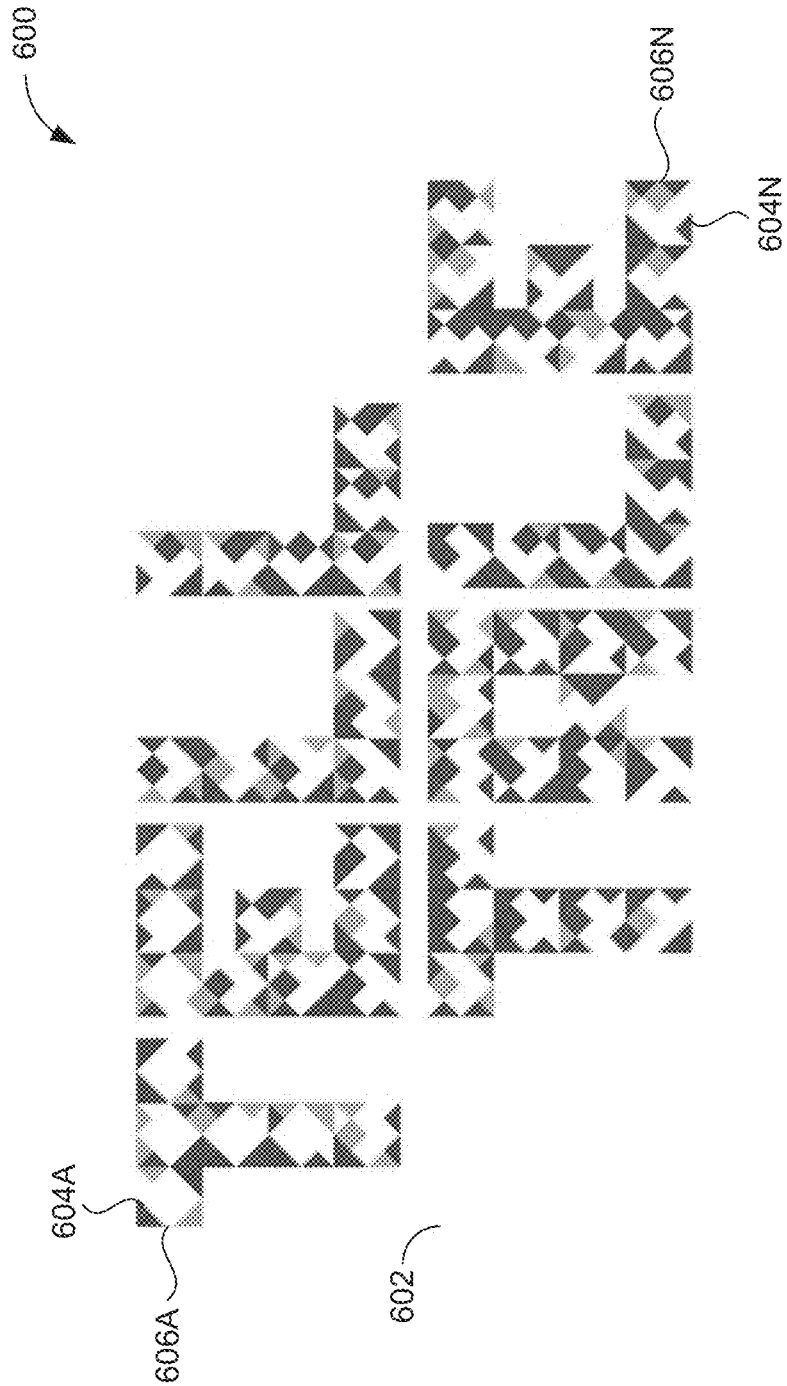
FIG. 6 is a schematic diagram showing an exemplary user interface illustrating generated candidate image units and the application of a unit grid, in accordance with embodiments of the present disclosure.

Turning now to FIG. 6, an exemplary user interface is provided illustrating the application of a unit grid to generated candidate image units, designated generally as user interface 600. The user interface 600 includes unit grid 602, candidate image units 604A through 604N, and unit spaces 606A through 606N. As described herein, a unit grid refers to a visual representation of a structure with at least one assignable unit space, such as unit spaces 606A through 606N. In embodiments, a unit grid can be a shape, a word, a phrase, or any other structure. A unit space can be used for storing a candidate image unit. In embodiments, a unit grid is applied to a number of candidate image units to create an image. The candidate image units, such as candidate image units 604A through 604N, are each a unique variation (e.g., contain a unique combination of image elements) of the same input image unit. As illustrated in FIG. 6, unit grid 602 is the phrase "TELL TALE." Unit grid 602 contains assignable unit spaces 606A through 606N. When a unit grid, such as unit grid 602 is applied to candidate image units, such as candidate image units 604A through 604N, the resulting image is a unit grid populated with assigned candidate image units, as seen in FIG. 6.

Figure 7:
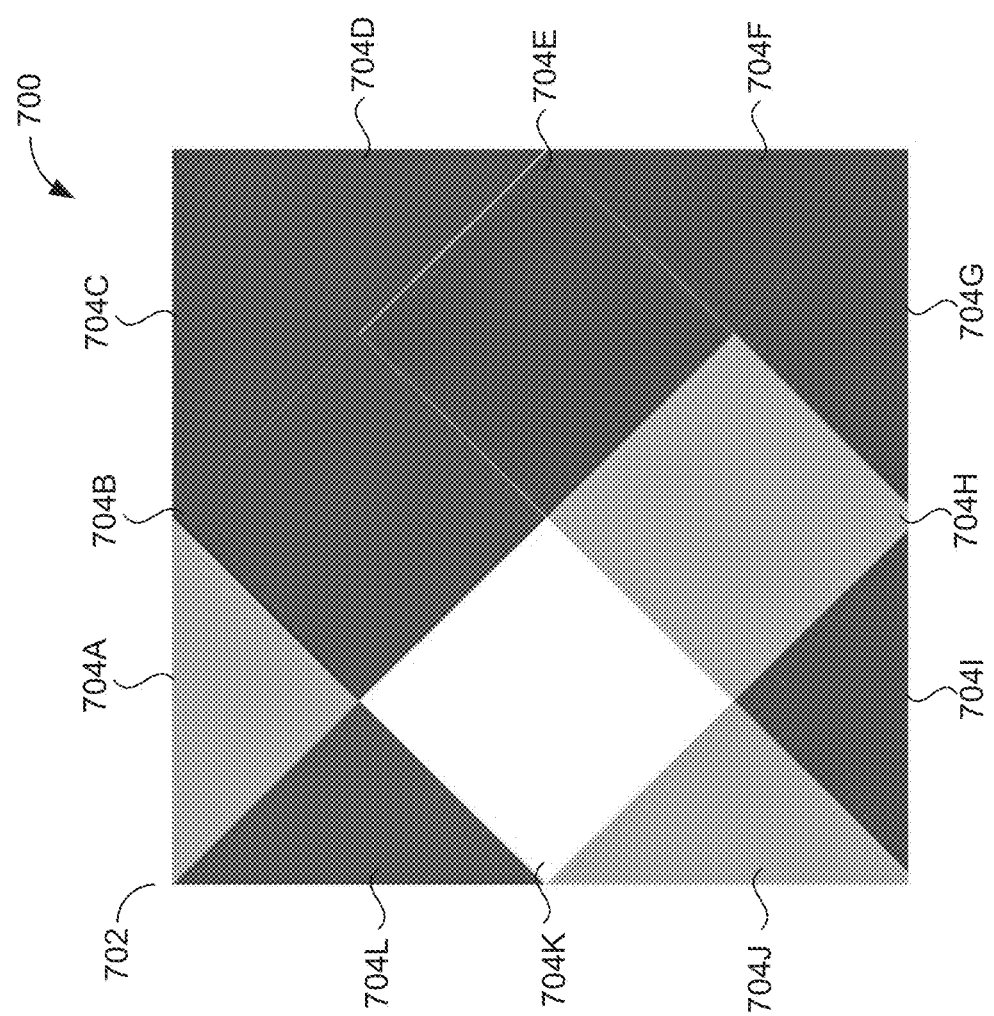
FIG. 7 is a schematic diagram showing an exemplary user interface illustrating a single generated candidate image unit and the application of a color assigned to each image element, the color based on a color palette, in accordance with embodiments of the present disclosure.

Turning now to FIG. 7, an exemplary user interface is provided illustrating a single generated candidate image unit and the application of a color assigned to each image element, the color based on a color palette, designated generally as user interface 700. The user interface 700 is displayed via a user device, such as user devices 104A through 104C of FIG. 1. The user interface 700 includes candidate image unit 702, and image elements 704A through 704L. The candidate image unit 702 is a unique variation (e.g., contain a unique combination of image elements) of an input image unit. Candidate image unit 702 illustrates a single candidate image unit including the removal of one image element, image element 704K. Each image element 704A through 704L has been assigned a color from a color palette. Based at least in part of a combination formula applied the input image unit, a dynamic content generation engine, such as dynamic content generation engine 200 of FIG. 2, generates candidate image unit 702.

Figure 8A:
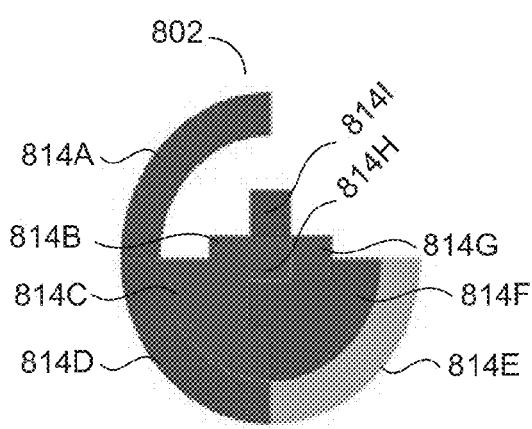
FIGS. 8*a*-8*f* are schematic diagrams showing exemplary user interfaces illustrating generated candidate image units and the application of a color assigned to each image element, the color based on a color palette, in accordance with embodiments of the present disclosure.
Figure 8D:
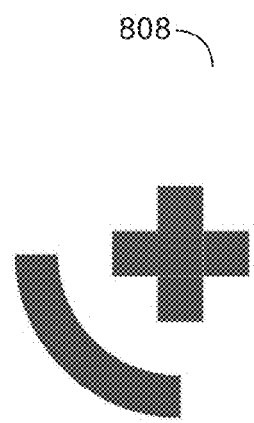
Figure 8B:
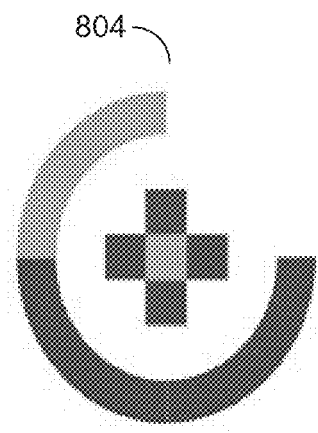
Figure 8E:
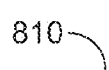
Figure 8C:
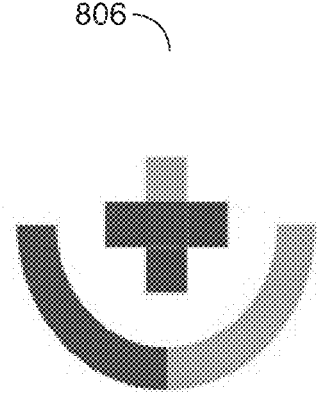
Figure 8F:

FIGS. 8a through 8f each provides a schematic diagram illustrating a unique candidate image unit and the application of a color assigned to each image element, the color based on a color palette. FIG. 8a includes candidate image unit 802 and image elements 814A through 814I. Image elements 814A through 814I have each been assigned a color from a color palette, and the removal of three image elements from the input image unit, such as input image unit 306D of FIG. 3. FIGS. 8b through 8f, each include a candidate image unit, such as candidate image units 804 through 812. Each candidate image unit contains image elements, such as image elements 814A through 814I. In particular, candidate image unit 804 of FIG. 8b is the result of five image elements removed and a color assigned to each image element based on a color palette. Candidate image unit 806 of FIG. 8c is the result of six image elements removed and a color assigned to each image element based on a color palette. Candidate image unit 808 of FIG. 8d is the result of seven image elements removed and a color assigned to each image element based on a color palette. Candidate image unit 810 of FIG. 8e is the result of eight image elements removed and a color assigned to each image element based on a color palette. Candidate image unit 812 of FIG. 8b is the result of ten image elements removed and a color assigned to each image element based on a color palette.

Figure 9:
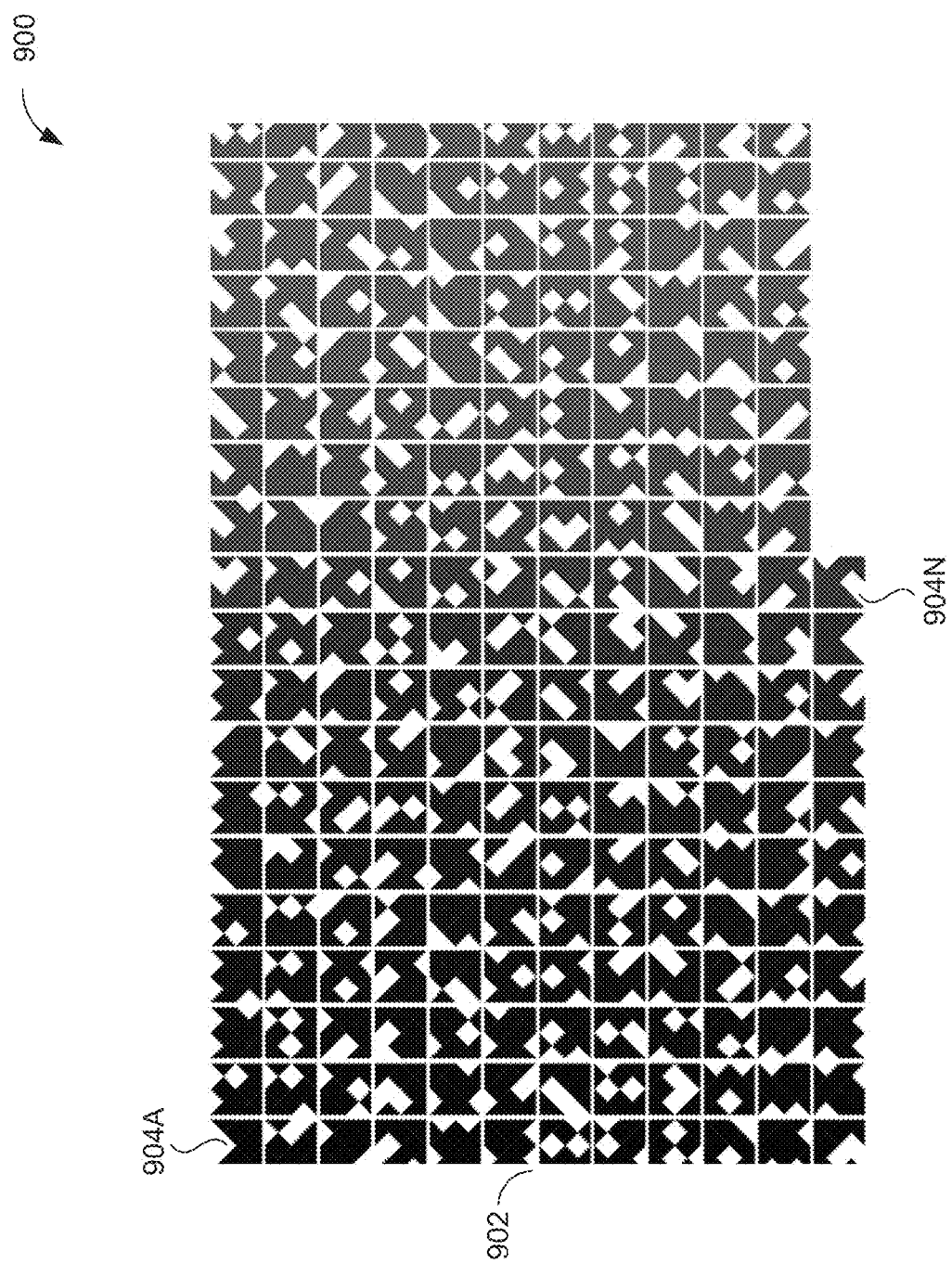
FIG. 9 is a schematic diagram showing an exemplary user interface illustrating generated candidate image units and the application of a color gradient, in accordance embodiments of the present disclosure.

Turning now to FIG. 9, an exemplary user interface is provided illustrating generated candidate image units and the application of a color gradient, designated generally as user interface 900. The user interface 900 is displayed via a user device, such as user devices 104A through 104C of FIG. 1. The user interface 900 includes color gradient 902 and candidate image units 904A through 904N. As described herein, a color gradient refers to image data that encodes a visual representation of a color gradient. In embodiments, a color gradient is applied to a number of candidate image units to create an image. As illustrated in FIG. 9, color gradient 902 is applied to candidate image units 904A through 904N such that candidate image units serves as pixels in the color gradient, and each candidate image unit 904A through 904N is assigned a color based on the color gradient 902.

Figure 10:
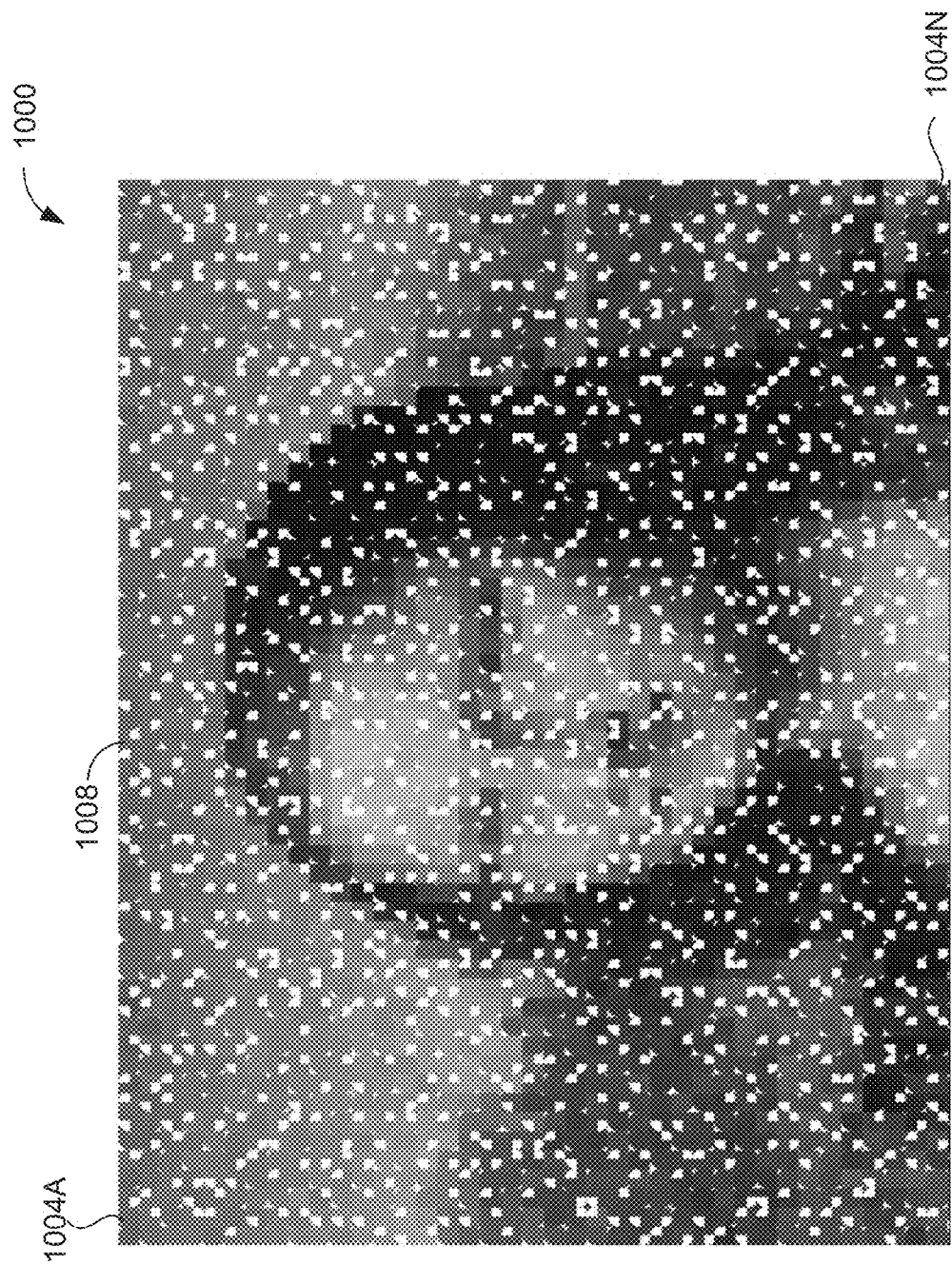
FIG. 10 is a schematic diagram showing an exemplary user interface illustrating generated candidate image units and the generation of an image based on the application of an image overlay, in accordance with embodiments of the present disclosure.

Turning now to FIG. 10, an exemplary user interface is provided illustrating generated candidate image units and the generation of an image based on the application of an image overlay, designated generally as user interface 1008. The user interface 1008 is displayed via a user device, such as user devices 104A through 104C of FIG. 1. FIG. 10 includes image overlay 1000 and candidate image units 1004A through 1004N. As described herein, an image overlay refers to image data that encodes a visual representation of an image. In embodiments, an image overlay is applied to a number of candidate image units to create an image. As illustrated in FIG. 10a, image overlay 1000 is applied to candidate image units 1004A through 1004N such that each candidate image unit serves as a pixel in the image, and each candidate image unit 1004A through 1004N is assigned a color based on the image overlay 1000.

Figure 11:
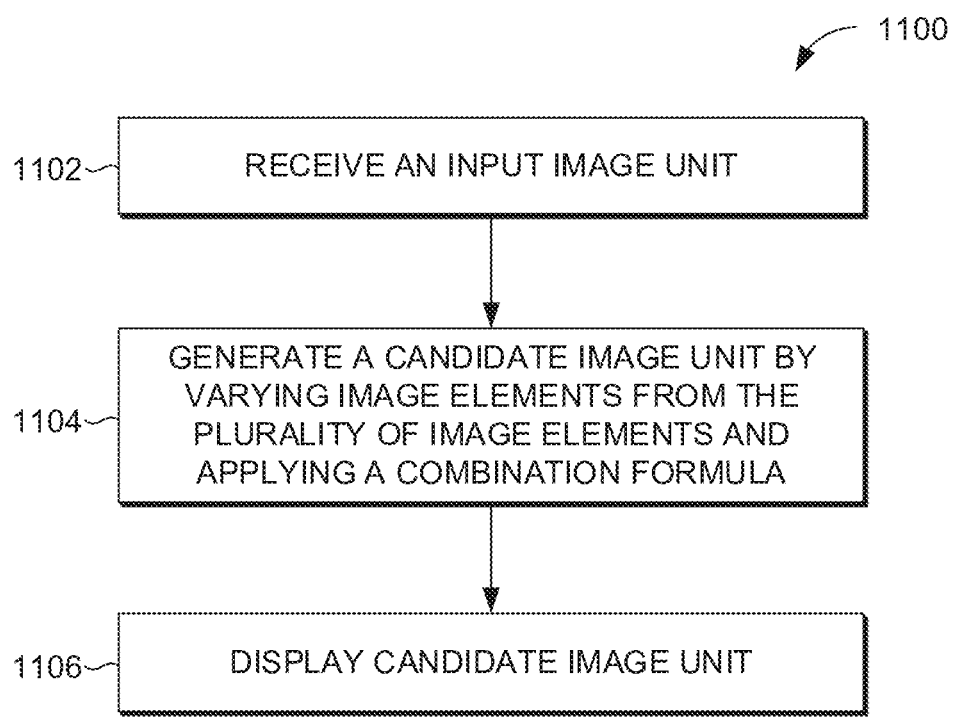
FIG. 11 is flow diagram showing an example method for generating candidate image units, in accordance with embodiments of the present disclosure.

Turning now to FIG. 11, is flow diagram showing an example method 1100 for generating candidate image units, in accordance with embodiments of the present disclosure. In embodiments, method 1100 is performed by a dynamic content generation engine, such as dynamic content generation engine 200 of FIG. 2. Initially, and at indicated at block 1102, an input image unit is received. At block 1104, candidate image units are generated. As described herein, candidate image units are generated based on combinations of a number of image elements associated with an input image unit. In embodiments image elements are added and/or removed. In further embodiments, image elements are each assigned a color based on a color palette. In even further embodiments, a combination formula is used to generate each unique candidate image unit. Referring to block 1106, the generated candidate image units are displayed for modification and/or selection.

Figure 12:
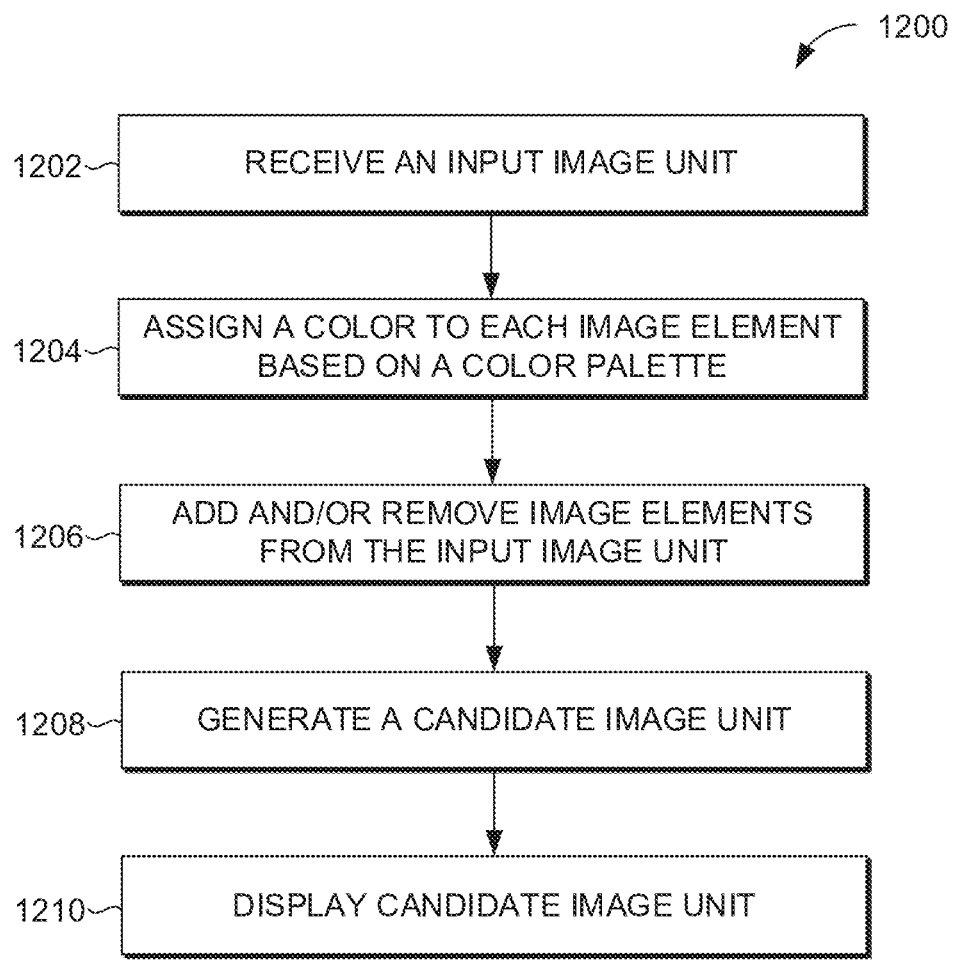
FIG. 12 is flow diagram showing an example method for generating candidate image units by assigning a color to each image element and adding and/or removing image elements from the input image unit, in accordance with embodiments of the present disclosure.

Turning now to FIG. 12, a flow diagram is provided showing an example method 1200 for generating candidate image units by assigning a color to each image element and adding and/or removing image elements from the input image unit, in accordance with embodiments of the present disclosure. In embodiments, method 1200 is performed by a dynamic content generation engine, such as dynamic content generation engine 200 of FIG. 2. Initially, and as indicated at block 1202, an input image unit is received. At block 1204, a color is assigned to each image element associated with the input image unit. At block 1206, various combinations of image elements are added and/or removed from the input image. At block 1208, candidate image units are generated. As described herein, candidate image units are generated based on combinations of a number of image elements associated with an input image unit. In embodiments, image elements are added and/or removed. In other embodiments, mage elements are each assigned a color based on a color palette. In even further embodiments, a combination formula is used to generate each unique candidate image unit. Referring to block 1210, the generated candidate image units are displayed for modification and/or selection.

Figure 13:
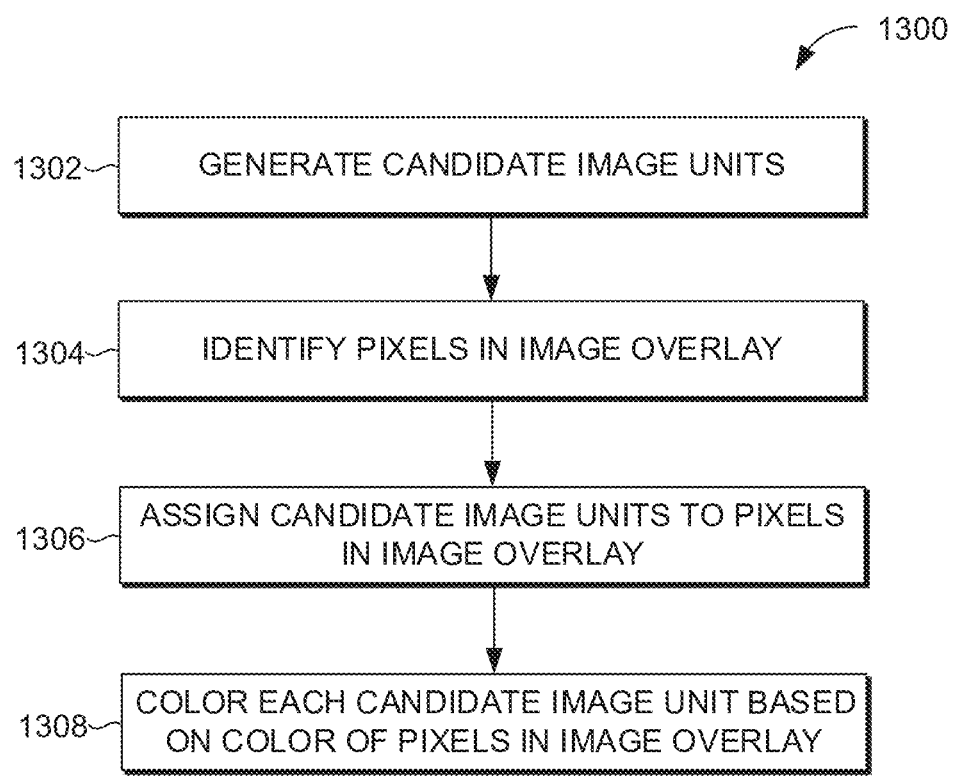
FIG. 13 is flow diagram showing an example method for generating candidate image units and applying an image overlay, in accordance with embodiments of the present disclosure.

Turning now to FIG. 13, a flow diagram is provided showing an example method 1300 for generating candidate image units and applying an image overlay, in accordance with embodiments of the present disclosure. In embodiments, method 1300 is performed by a dynamic content generation engine, such as dynamic content generation engine 200 of FIG. 2. Initially, and as indicated at block 1302, a number of candidate image units are generated. As discussed herein, candidate image units are generated based on varying the image elements in an input image unit and applying a combination formula. At block 1304, pixels in an image overlay are identified. Referring to block 1306, each candidate image unit is assigned to a pixel in the image overlay. At block 1308, each candidate image unit is colored based on the color of the pixel to which it is assigned in the image overlay.

Figure 14:
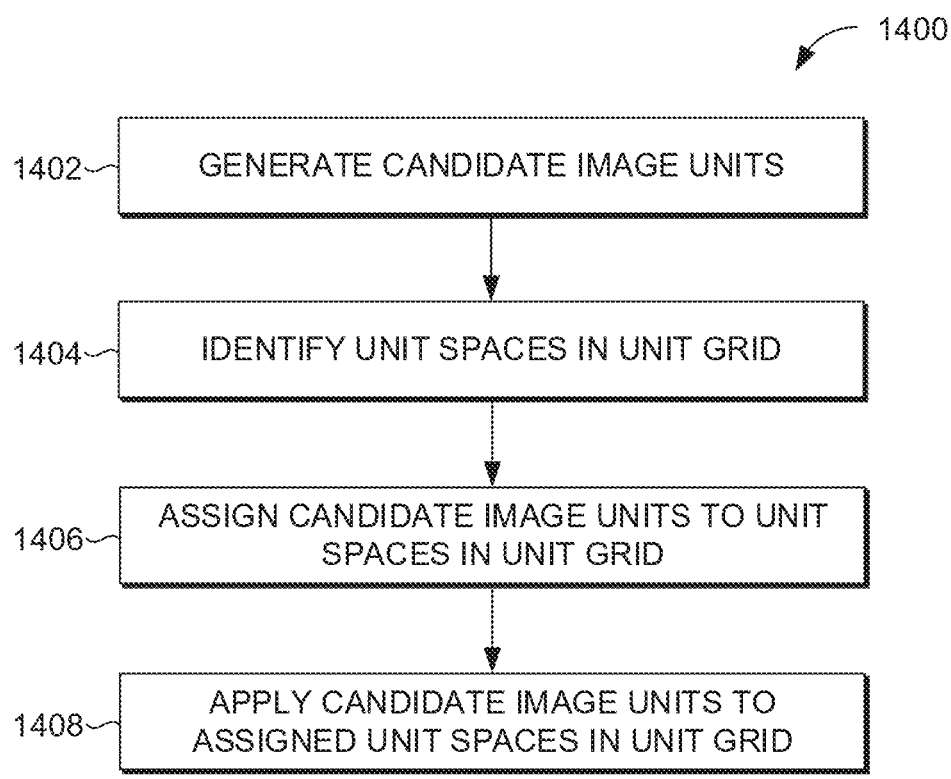
FIG. 14 is flow diagram showing an example method for generating candidate image units and applying a unit grid, in accordance with embodiments of the present disclosure.

Turning now to FIG. 14, a flow diagram is provided showing an example method 1400 for generating candidate image units and applying a unit grid, in accordance with embodiments of the present disclosure. In embodiments, method 1400 is performed by a dynamic content generation engine, such as dynamic content generation engine 200 of FIG. 2. Initially, and as indicated at block 1402, a number of candidate image units are generated. As discussed herein, candidate image units are generated based on varying the image elements in an input image unit and applying a combination formula. At block 1404, unit spaces in a unit grid are identified. Referring to block 1406, candidate image units are assigned to unit spaces in the unit grid. At block 1408, candidate image units are applied to their assigned unit spaces in the unit grid. At block 1412, a unit grid is applied to the generated candidate image units to generate a new image.

Figure 15:
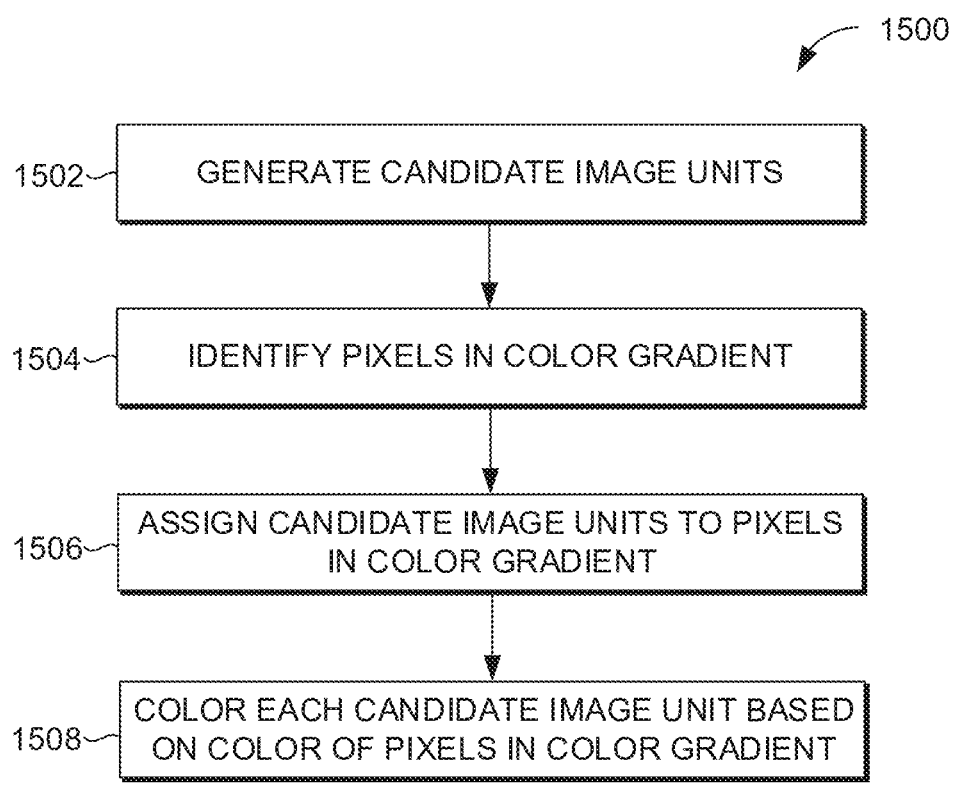
FIG. 15 is flow diagram showing an example method for generating candidate image units and applying a color gradient, in accordance with embodiments of the present disclosure.

Turning now to FIG. 15, a flow diagram is provided showing an example method 1500 for generating candidate image units and applying a color gradient, in accordance with embodiments of the present disclosure. In embodiments, method 1500 is performed by a dynamic content generation engine, such as dynamic content generation engine 200 of FIG. 2. Initially, and as indicated at block 1502, a number of candidate image units are generated. As discussed herein, candidate image units are generated based on varying the image elements in an input image unit and applying a combination formula. At block 1504, pixels in a color gradient are identified. Referring to block 1506, each candidate image unit is assigned to a pixel in the color gradient. At block 1508, each candidate image unit is colored based on the color of the pixel to which it is assigned in the color gradient.

Exemplary Operating Environment

Figure 16:
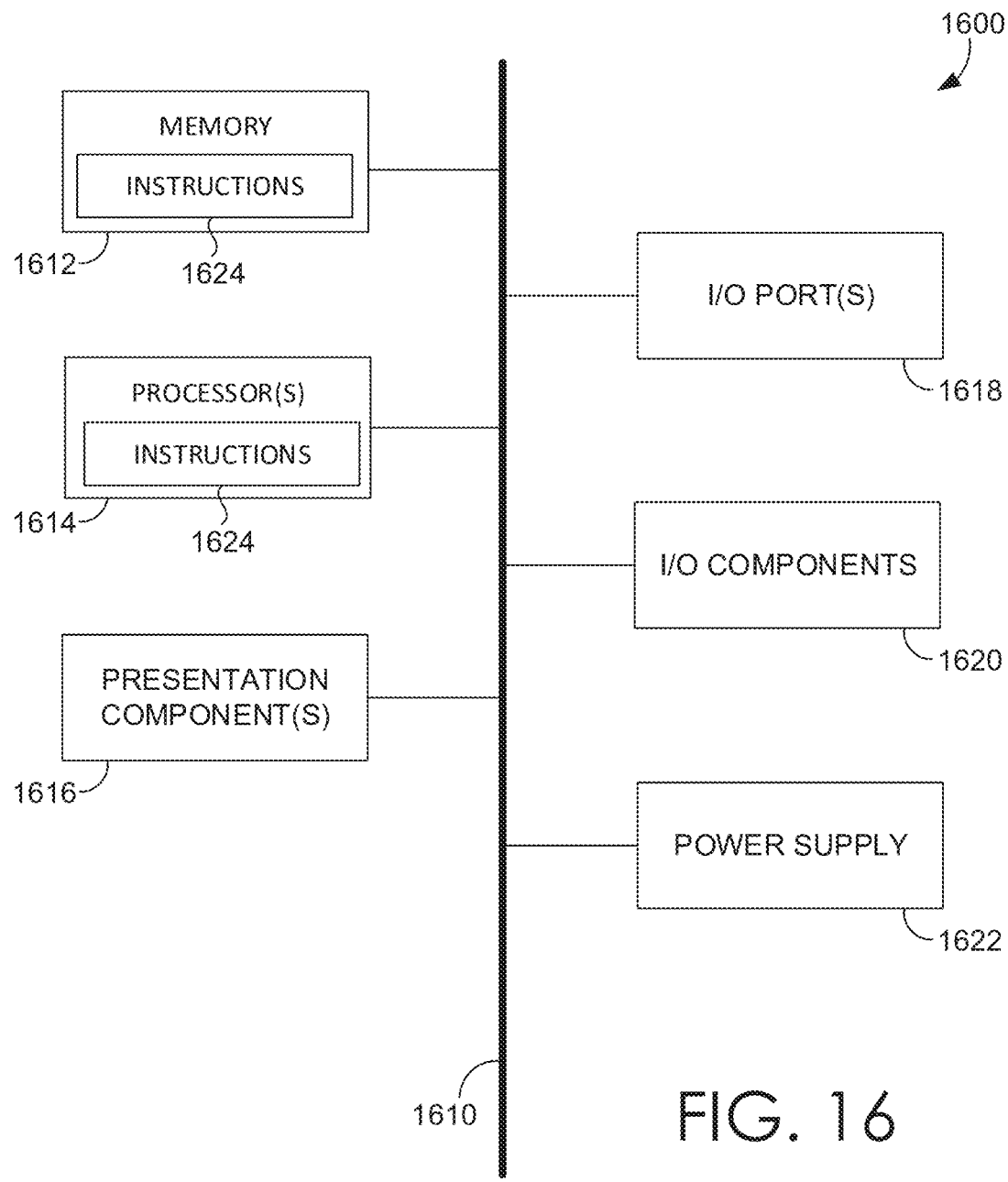
FIG. 16 is a block diagram of an exemplary computing environment suitable for use in implementing embodiments of the present disclosure.

Having described an overview of embodiments of the present invention, an exemplary operating environment in which embodiments of the present invention may be implemented is described below in order to provide a general context for various aspects of the present invention. Referring now to FIG. 16 in particular, an exemplary operating environment for implementing embodiments of the present invention is shown and designated generally as computing device 1600. Computing device 1600 is but one example of a suitable computing environment and is not intended to suggest any limitation as to the scope of use or functionality of the invention. Neither should computing device 1600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 16, computing device 1600 includes bus 1610 that directly or indirectly couples the following devices: memory 1612, one or more processors 1614, one or more presentation components 1616, input/output (I/O) ports 1618, input/output components 1620, and illustrative power supply 1622. Bus 1610 represents what may be one or more busses (such as an address bus, data bus, or combination thereof). Although the various blocks of FIG. 16 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 16 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 16 and reference to "computing device."

Computing device 1600 typically includes a variety of computer-readable media. Computer-readable media can be any available media that can be accessed by computing device 1600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1612 includes computer-storage media in the form of volatile and/or nonvolatile memory. The memory may be removable, non-removable, or a combination thereof. Exemplary hardware devices include solid-state memory, hard drives, optical-disc drives, etc. Computing device 1600 includes one or more processors that read data from various entities such as memory 1612 or I/O components 1620. Presentation component(s) 1616 present data indications to a user or other device. Exemplary presentation components include a display device, speaker, printing component, vibrating component, etc.

I/O ports 1618 allow computing device 1600 to be logically coupled to other devices including I/O components 1620, some of which may be built in. Illustrative components include a microphone, joystick, game pad, satellite dish, scanner, printer, wireless device, etc. The I/O components 1620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 1600. Computing device 1600 may be equipped with depth cameras, such as stereoscopic camera systems, infrared camera systems, RGB camera systems, touchscreen technology, and combinations of these, for gesture detection and recognition. Additionally, the computing device 1600 may be equipped with accelerometers or gyroscopes that enable detection of motion. The output of the accelerometers or gyroscopes may be provided to the display of computing device 1600 to render immersive augmented reality or virtual reality.

Embodiments described herein facilitate the automatic generation of candidate image units based in input image units and combinations image elements. Components described herein refer to integrated components of automatic dynamic branding generation system. The integrated components refer to the hardware architecture and software framework that support functionality using the dynamic branding system. The hardware architecture refers to physical components and interrelationships thereof, and the software framework refers to software providing functionality that can be implemented with hardware embodied on a device.

The universal dynamic branding system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when executed by one or more computing devices, causes the one or more computing devices to perform operations, the operations comprising:
    receiving an input image unit, the input image unit comprising a plurality of image elements;
    generating a plurality of candidate image units from the input image unit by varying image elements from the plurality of image elements using a combination formula to determine different combinations of image elements from the plurality of image elements, wherein varying the image elements is based on adding and/or removing different combinations of image elements from the plurality of image elements in the input image unit, each candidate image unit from the plurality of candidate image units comprising a unique combination of image elements determined by the combination formula; and
    providing, for display at a user interface, the plurality of candidate image units.

2. The one or more computer storage media of claim 1, wherein the generating further comprises iterating through each combination of added and/or removed image elements using the combination formula until all unique combinations of image elements have been exhausted.

3. The one or more computer storage media of claim 1, wherein the plurality of candidate image units are generated by applying different colors to image elements from the plurality of image elements in the input image unit.

4. The one or more computer storage media of claim 3, wherein each image element from the plurality of image elements is assigned a color based on a color palette.

5. The one or more computer storage media of claim 1, further comprising:
    generating an image based on an image overlay applied to the plurality of candidate image units, wherein each candidate image unit from the plurality of candidate image units serves as a pixel in the image, each candidate image unit is colored based on the image overlay.

6. The one or more computer storage media of claim 1, further comprising:
    generating an image based on a unit grid applied to the plurality of candidate image units, wherein the unit grid comprises a plurality of unit spaces, each candidate image unit from the plurality of candidate image units is assigned to each unit space of the plurality of unit spaces of the unit grid.

7. The one or more computer storage media of claim 1, further comprising:
    generating an image based on a color gradient applied to the plurality of candidate image units, wherein each candidate image unit from the plurality of candidate image units serves as a pixel in the image, each candidate image unit is colored based on the color gradient.

8. The one or more computer storage media of claim 1, further comprising:
    generating a pattern by adjusting spacing between each candidate image unit from the plurality of candidate image units.

9. The one or more computer storage media of claim 1, further comprising:
    exporting a vector file with vector data comprising at least a portion of the plurality of candidate image units.

10. A computer-implemented method comprising:
    receiving an input image unit, the input image unit comprising a plurality of image elements;
    generating a plurality of candidate image units from the input image unit by:
    identifying the plurality of image elements in the input image unit; and
    adding and/or removing image elements from the plurality of image elements in the input image unit to generate the plurality of candidate image units by iterating through different combinations of added and/or removed image elements using a combination formula to determine different combinations of image elements from the plurality of image elements; and
    outputting the plurality of candidate image units, each candidate image unit from the plurality of candidate image units comprising a unique combination of image elements.

11. The method of claim 10, wherein iterating through different combinations of added and/or removed image elements using the combination formula continues until all unique combinations of image elements have been exhausted.

12. The method of claim 10, wherein the plurality of candidate image units are generated by applying different colors to image elements from the plurality of image elements in the input image unit.

13. The method of claim 12, wherein each image element from the plurality of image elements is assigned a color based on a color palette.

14. The method of claim 10, further comprising:
    generating an image based on an image overlay applied to the plurality of candidate image units, wherein each candidate image unit from the plurality of candidate image units serves as a pixel in the image, each candidate image unit is colored based on the image overlay.

15. The method of claim 10, further comprising:
    generating an image based on a unit grid applied to the plurality of candidate image units, wherein the unit grid comprises a plurality of unit spaces, each candidate image unit from the plurality of candidate image units is assigned to each unit space of the plurality of unit spaces associated with the unit grid.

16. The method of claim 10, further comprising:
    generating an image based on a color gradient applied to the plurality of candidate image units, wherein each candidate image unit from the plurality of candidate image units serves as a pixel in the image, each candidate image unit is colored based on the color gradient.

17. The method of claim 10, wherein the method further comprises:
   generating a pattern by adjusting spacing between each candidate image unit from the plurality of candidate image units.

18. A computer system comprising:
   one or more processors; and
   one or more non-transitory computer-readable storage media, coupled with the one or more processors, having instructions stored thereon, which, when executed by the one or more processors, cause the computing system to provide:
   means for receiving an input image unit, the input image unit comprising a plurality of image elements;
   means for generating a plurality of candidate image units from the input image unit by adding and/or removing different image elements from the input image unit using a combination formula to determine different combinations of image elements from the plurality of image elements; and
   means for providing, for display at a user interface, the plurality of candidate image units.

19. The system of claim 18, wherein the means for generating the plurality of candidate image units continue to generate candidate image units using the combination formula until all unique combinations of image elements have been exhausted.

* * * * *